3,826,687
SEALS OF THE Li/SO₂ ORGANIC ELECTROLYTE CELLS
Arabinda N. Dey, Needham, Mass., assignor to
P. R. Mallory & Co., Inc., Indianapolis, Ind.
Filed May 7, 1973, Ser. No. 358,214
Int. Cl. H01m 1/02
U.S. Cl. 136—133        8 Claims

ABSTRACT OF THE DISCLOSURE

A seal arrangement is provided for electrochemical cells commonly containing a gas component dissolved in the electrolyte. The arrangement also acts as a terminal and provides a gas-impermeable closure for the cell container while providing electrically conductive surfaces so that portions of said seal arrangement may serve as a terminal for the cell. A gas-impermeable seal element of the arrangement is a polymer film coated on both sides of an aluminum foil and bonded to said aluminum. The polymeric film provides a measure of gas-impermeability and provides heat-sealable surfaces and the aluminum foil provides strength and gas-impermeability. The arrangement provides for the positioning of the foil-polymer composite around the metallic upper portion of the cell assembly in a manner that the metallic elements may be heat sealed thereto including the container of the cell and a heat shrinkable overlaying sleeve.

BACKGROUND OF THE INVENTION

Figure 1:
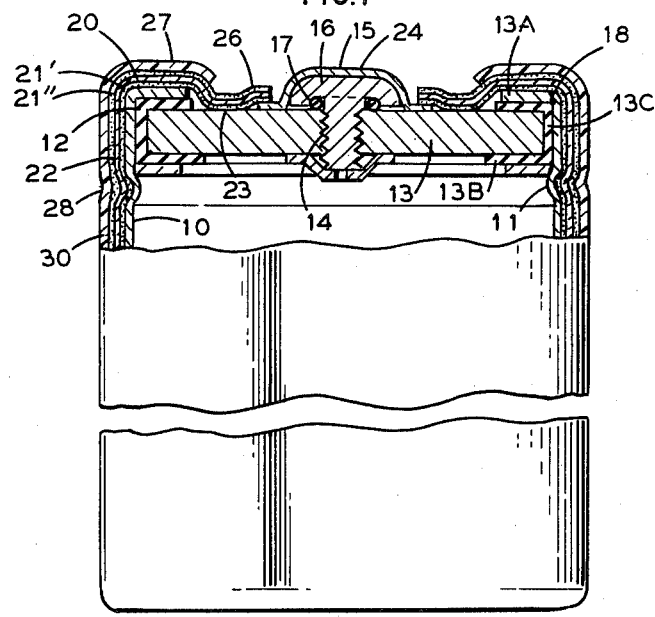

This invention relates to electrochemical cells and more particularly it relates to gas-impermeable closure means for electrochemical cells containing a gaseous or high vapor pressure component in the electrolyte.

Organic electrolyte cells show exceedingly high stability, long shelf life on storage at ambient temperatures and high initial voltages. Among such organic electrolyte cells are those based on lithium as the active anode metal and utilizing $SO_2$ as a cathodic element and as an electrolyte component. The electrolyte consists of an organic solvent such as tetrahydrofuran, propylenecarbonate, acetonitrile. Dissolved in these solvents is $SO_2$. It is very important to provide a proper gas tight seal for such cells particularly where they are subject to long periods of storage before activation. Loss of the gaseous component of the cell will result in marked reduction in capacity. Further, $SO_2$ vapors are toxic and corrosive to most metal parts used in the construction of electronic instruments and therefor any escaping $SO_2$ will within the periods for which these cells are normally kept in storage cause considerable havoc in electronic parts stored in closed association therewith.

The sealing of organic electrolyte Li/$SO_2$ pressurized D cells has been accomplished by crimping the cylindrical can lip over the rubber grommet of the cell tops. The cell top of aluminum was provided with a filling port. After the electrolyte was introduced into the cell, usually at low temperatures, the electrolyte fill port was sealed by means of a screw and rubber "O" ring. One of the problems associated with compression seals such as around the rubber grommet and the rubber "O" ring is the diffusion of the gaseous $SO_2$ through rubber. The rate of such diffusion has been found to be appreciable. The rate of diffusion of $SO_2$ from a D cell as determined by the weight loss of the D cell when stored at 72° C. for about four months as provided in commercial and military specifications for such cells is shown in the upper curve of FIG. 2. According to the weight loss data the average rate of diffusion of $SO_2$ is approximately 30 mg./day. While this is not significant in terms of the loss of cell capacity, in view of the fact that $SO_2$ vapors are toxic and corrosive to most metal parts used for the construction of electronic instruments and particularly to many semi-conductor elements, the quantity of $SO_2$ escaping from a D cell is sufficient to cause at appreciable damage to the vital electronic components for which the electrochemical cell is to provide activation energy.

THE INVENTION

I have devised a method for protecting the sealing areas so that the $SO_2$ diffusion rate is considerably reduced (less than 3.0 mgm. per day). My method involves the use of an aluminum foil laminate which is heat sealable. The diffusion rates of $SO_2$ through aluminum foils are exceedingly low. I have laminated aluminum foils with films of polymeric heat-sealable materials to reinforce them. Particularly preferred as such a film is polyethylene. The laminated polyethylene in the foils is quite resistant to $SO_2$ and provides excellent electrical insulation and good mechanical bonding of the aluminum foil to the cell wall and cell top across the crimped areas by heat sealing. The aluminum foil alone can not be used for Li/$SO_2$ cell construction as it is not capable of retaining the pressures normally generated in such cells. Accordingly, this invention is based upon a composite wherein the laminated aluminum foil is used in conjunction with a crimped seal metal can structure overlaid by a heat-shrinkable sleeve.

DETAILED DESCRIPTION OF THE INVENTION

Figure 2:
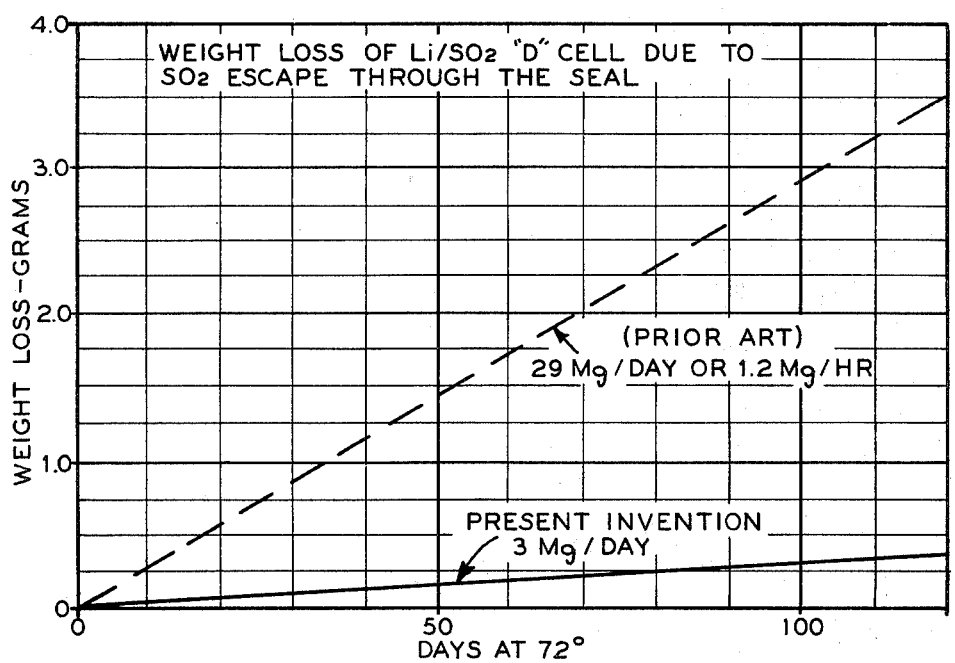

The invention will be more completely described in conjunction with the Drawing wherein FIG. 2 shows a gas-impermeable terminal and seal means for electrolytic cells utilizing an electrolyte or other components containing dissloved gases or gases under pressure. The electrochemical cell is housed in a cell container 10 consisting of a metal or other rigid material compartment provided at its upper end with closure support means 11. Lying above the closure support means is the terminal-seal assembly 12, which is supported by said support means. The preferred form of support means is a groove or indentation causing a reduction in the diameter of the container so that the support means is idealy a ridge within the container. The terminal seal assembly 12 includes an aluminum or other metal wafer cell-top 13. This cell top is of smaller diameter than the container but a larger diameter than the support means 11 so that it fits upon but within the container 10. The aluminum wafer 13 is provided with a cell-filling port 14 for the introduction of the electrolyte containing the dissolved gases. The aluminum wafer 13, generally circular in section has a top surface 13a, a bottom surface 13b and an edge 13c. The filling port 14 is sealed after the introduction of the electrolyte by bolt 15. Bolt 15 is provided with a recessed bolt cap 16. Fitted into the recess of bolt cap 16 is an "O" ring 17. Upon tightening of bolt 15 to seal the filling port 14, the recessed bolt cap 16 compresses "O" ring 17 to provide an initially gas tight seal which is liquid tight. The "O" ring being made of rubber, however, is slightly gas permeable and permits some diffusion of the gases contained within the cell container through the body of the "O" ring and thence from the cell. However "O" ring 17 may also be fabricated from gas-impermeable metals such as soft malleable aluminum alloys.

Aluminum wafer cell top 13 is provided along its edge 13c with a resilient grommet seal means 18. Since considerable resilience is necessary to provide a proper seal along the outer peripheral edge surface, rubber is the preferred seal material for said grommet 18. This grommet is compressed within the container 10 so that a compression fit is obtained between aluminum wafer top 13 and said cell container 10 via resilient seal means 18. As grommet 18 is made of rubber, it is substantially gas-permeable, permitting the diffusion of gases from the interior of the cell. In order to overcome this diffusion, a gas-impermeable film barrier composite is overlaid on the aluminum wafer cell top 13 and heat sealed to the top surface 13a thereof around port 14. The film barrier composite consists of a thin flexible aluminum foil laminated at least one one side with a heat sealable polymeric film resistant to gas diffusion such as polyethylene. Preferably both sides of the aluminum foil should be laminated with the polymeric films. The lamination preferably should make the composite into a unit via bonding or heat sealing of the polymeric material to the aluminum or by melt coating the aluminum.

The gas diffusion-resistant polymers and the thin flexible aluminum foil have additionally, as a result of the types of polymer being used, the property of being heat sealable.

The barrier composite 20, comprising polymeric films 21' and 21" surrounding aluminum foil 22, overlays at least the peripheral portion of the top surface of the wafer 13 and extends over the crimped portion 27 of container 10 which compresses grommet 18, and down the body of container 10 and is heat sealed thereto. It may also be heat sealed to the peripheral portions of wafer 13. Additionally, it is advantageous to have a terminal cap 24 welded to the upper surface of bolt cap 16 of filling port sealing bolt 15 after filling is completed. This metallic cap 24 is positioned below the film barrier composite 20 radially inward from said peripheral heat seal areas 23. The film barrier composite is then heat sealed to the metallic terminal cap 24 in areas 26. The cell container 10 is covered by a heat-shrinkable jacket 30 which extends over the portions of container to which barrier composite 20 is sealed. As cap 24 and wafer 13 are electronically conductive they serve as one terminal for the cell.

In order to conduct electricity from the electrochemical components (not shown) a lead 30 from one set of electrodes is welded or electronically conductive attached to aluminum wafer cell top 13. The cell container 10 when it is composed of a metal acts as the other electrode. When the cell container is of polymeric material, other terminal means (not shown) must be provided. As it can be seen in the cross section view of the cell closure as shown in FIG. 2 the aluminum wafer cell top 13 of a Li/$SO_2$ D cell is first coated with a layer of polyethylene by dipping the wafer 13 in a warm xylene solution of polyethylene and then curing it in an oven at 120° C. It if fitted over the electrode assembly in the container and lead 30 is welded thereto. Grommet 18 engages the sides of container 10 which is then crimped or rolled. The cell is then cooled to −72° C. in Dry Ice and cold electrolyte is injected through filling port 14. After filling the cell, the filling port sealing bolt 15 is inserted and tightened. Compressing "O" ring 17 within the recess 16 in filling bolt 15. The aluminum terminal cap 24 is then welded to bolt cap 16 for electrical contact. Polyethylene double coated aluminum foil film barrier composite 20 consisting of two mil polyethylene films 21', 21" coated on either side of one mill aluminum foil 22 is preformed by heat to fit the contour of the cell top. The preforming is done on a Teflon mold. The preformed aluminum foil laminate barrier 20 is then positioned and heat sealed to the cell top by means of a Teflon coated hot plate designed to fit the contour of the heat sealing areas 23 and then heat sealed to the container 10. The polyethylene on the aluminum foil acts both as an insulating and bonding agent. The entire cell container 10 is then slipped within a heat shrinkable polyvinyl jacket which is heat shrunk to fit tightly over the entire cell and to act as a preserving and leak-proof coating.

Although $SO_2$ does not diffuse through the aluminum foil it does have a finite diffusability through polyethylene. Therefore, the composite acts both to deter and block substantially all diffusion of $SO_2$ from the interior of the cell. As the rate of diffusion depends upon the length and the cross sectional area of the polyethylene. According to this invention the long areas for diffusion have been increased, by increasing the seal areas and the cross sectional areas have been decreased by decreasing the thickness of the polyethylene films. As a result a drastic reduction of the $SO_2$ diffusion rate is achieved, as can be seen by the lower curve in FIG. 1.

It will be seen that the above invention as described is broadly disclosed. However, all equivalents of the described and named components are intended.

What is claimed is:

1. Gas-impermeable terminal and seal assembly for electrolytic cells utilizing dissolved gases comprising a cell container for said electrolytic cell surrounded at its outer portion by a heat shrinkable jacket said container having at its upper portion a support means for a terminal-seal assembly comprising an aluminum-wafer cell top, having top, bottom and edge surfaces fitting within and covering substantially the open portion of the cell container and being provided with a threaded filling-port receiving an aluminum filling-port seal bolt which is provided with a recessed cap and fitted within the recess with an "O" ring seal means for providing a gas-tight seal of said port between said wafer and said bolt, when said bolt is seated in said threaded port; said wafer being provided with a resilient seal means surrounding its edge adjacent to said cell container and a substantially gas-impermeable polymeric film barrier laminated on each side of a thin flexible aluminum foil to provide a gas barrier composite; said barrier composite being interposed in pressure-sealing relationship between said container and said resiliently surrounded edge of said wafer cell top and overlaying at least peripheral portions of the top surface of said cell top wafer and having the polymer film barrier heat sealed to said cell top at its top surface adjacent to said filling port said cell top being positioned by said support means and compressingly engaged by said cell container with said gas barrier composite overlaying said container within said heat shrinkable sleeve and being heat sealed at least to said container.

2. The terminal-seal assembly according to claim 1, wherein said seal bolt is overlain by a metallic cap that is heat-sealed at its outer edges to said barrier composite in areas overlaying said upper surface.

3. The terminal-seal assembly according to claim 1, wherein said cell-top is compressingly engaged to said cell container by crimping said cell container at its upper portion around said resilient covered edge.

4. The terminal and seal assembly according to claim 1, wherein said composite is heat sealed to said container in areas wherein said barrier composite contacts said support means.

5. According to claim 1, wherein said composite is also heat sealed to said overlying sleeve.

6. The terminal and seal assembly according to claim 1, wherein said composite barrier consists of two flexible, heat-sealable polyethylene foils heat sealed to an interposed flexible foil of aluminum metal.

7. The terminal and seal assembly according to claim 1, wherein said aluminum wafer cell-top is conductively connected to one of the two electrodes of the cell thereby, through said portal sealing bolt, conducting the electro chemical energy through said seal whereby the upper portion of said bolt acts as the terminal for said one electrode.

8. The terminal and seal means according to claim 7, wherein said container is connected to the other of said electrode and a terminal is provided penetrating through said heat shrinkable seal to provide the other terminal for said other electrode.

References Cited

UNITED STATES PATENTS

| | | | |
|---|---|---|---|
| 3,081,367 | 3/1963 | Field et al. | 136—133 X |
| 3,457,117 | 7/1969 | Angelovich | 136—107 X |
| 3,506,495 | 4/1970 | Reilly et al. | 136—107 |
| 3,660,168 | 5/1972 | Ralston et al. | 136—107 |
| 3,736,190 | 5/1973 | Dey et al. | 136—133 |

WINSTON A. DOUGLAS, Primary Examiner

C. F. LEFVOUR, Assistant Examiner

U.S. Cl. X.R.

136—6 LN, 107